United States Patent

[11] 3,609,251

[72] Inventor Itsuki Ban
No. 829, Higashi-Oizumi-machi, Nerima-ku, Tokyo, Japan
[21] Appl. No. 764,862
[22] Filed Oct. 3, 1968
[45] Patented Sept. 28, 1971
[32] Priority Oct. 3, 1967, Oct. 3, 1967
[33] Japan
[31] 42/63288 and 42/63289

[54] PROGRAM-SELECTING MEANS FOR ENDLESS MAGNETIC TAPE REPRODUCING APPARATUS
8 Claims, 8 Drawing Figs.

[52] U.S. Cl. ........ 179/100.2, 179/100.1
[51] Int. Cl. ........ G11b 15/44
[50] Field of Search ........ 179/100.1 PS, 100.2 S, 100.1 VC, 100.3 D; 340/174.1 C; 226/42

[56] References Cited

UNITED STATES PATENTS

| | | | |
|---|---|---|---|
| 3,115,289 | 12/1963 | Namenyi-katz | 179/100.2 |
| 3,177,767 | 4/1965 | Templeman | 179/100.2 |
| 3,192,509 | 6/1965 | Durand et al. | 179/100.2 |
| 3,376,564 | 4/1968 | Holland | 179/100.2 |
| 2,782,262 | 2/1957 | Hammond, Jr. et al. | 179/100.1 |

*Primary Examiner*—James W. Moffitt
*Assistant Examiner*—Raymond F. Cardillo, Jr
*Attorney*—Morgan, Finnegan, Durham & Pine

ABSTRACT: Program-selecting system for an endless magnetic tape reproducing apparatus wherein a particular program recorded on the tape can be selected automatically for almost immediate playback independent of its position thereon. By using a sensing circuit to generate an output signal every time an unrecorded area between programs is detected, by comprising in a comparison circuit the number of generated outputs with a preselected number corresponding to the sequential location of the desired program upon the tape and by having an output generated every time a comparison is achieved, the output causing the tape feed to switch from a fast rate of feed to a governed rate of feed, a program-selecting system is created that provides for the automatic playback of a particular program recorded on an endless magnetic tape.

INVENTOR

ITSUKI BAN

BY Morgan Finnegan Durham & Pine

ATTORNEYS

INVENTOR

ITSUKI BAN

BY Morgan Finnegan Durham & Pine

ATTORNEYS

INVENTOR

ITSUKI BAN

BY Morgan Finnegan Durham & Pine
ATTORNEYS

PROGRAM-SELECTING MEANS FOR ENDLESS MAGNETIC TAPE REPRODUCING APPARATUS

BACKGROUND OF THE INVENTION

This invention relates to program-selecting means for an endless tape reproducing apparatus, which is capable of selecting one out of a plurality of programs recorded on a sound track of an endless magnetic tape and of reproducing the program.

A reproducing apparatus utilizing an endless tape cartridge has been provided, heretofore, with means for selecting a sound track on the tape. Under such system, it is impossible to automatically select one program at random from a track. Further, under such systems, the number of a program within the sequence of programs played on one track is not known even though indication of the sound track is made.

A conventional endless magnetic reproducing apparatus is insufficient in selection of a program for the reasons as set forth in the above.

A currently available endless tape cartridge provides for a magnetic tape to have nonsignal areas or portions for a certain interval between the programs thereon. By utilizing such nonsignal areas, it is possible to select a program as well as indicate the same.

SUMMARY OF THE INVENTION

It is an object of the invention to provide program-selecting means for an endless magnetic tape reproducing apparatus which is capable of indexing some out of a plurality of programs recorded on one track on the tape and of selecting the program by quickly feeding the tape to the number of programs.

A further object of the invention is to provide program-selecting means for an endless magnetic tape reproducing apparatus wherein a quick tape feeding is effected by controlling the actuation of a governed circuit of an electric motor.

Another object of the invention is to provide program-selecting means for an endless magnetic tape reproducing apparatus wherein an index of the program to be quickly fed is made by depression of a pushbutton switch or rotation of a cam plate. The nonsignal area between the programs is sensed by a sensing circuit to restore the pushbutton switch or cam plate so that the magnetic tape is fed at constant speed upon quick feeding to the indexed program.

Still another object of the invention is to provide program-selecting means for an endless magnetic tape reproducing apparatus which is capable of sufficiently selecting a program be means of program-indicating means which shows what program is recorded on the tape.

A still further object of the invention is to provide program-selecting means for an endless magnetic tape reproducing apparatus wherein an end mark appearing on the tape which is made of a conductive foil is sensed whereby the legend of the indicating means is restored to show the first program.

A more particular object of the invention is to provide program-selecting means for an endless magnetic tape reproducing apparatus wherein a ring-count circuit in program with indicating means and an alternative selecting switch is utilized as program-indexing means, the output signal from the former and latter being compared by an AND circuit, quick feed of the tape being controlled by the output of the AND circuit to select the desired program. Further objects and advantages of the invention will become apparent upon consideration of the specification and the following accompanying, in which:

DESCRIPTION OF THE PREFERRED EMBODIMENT

Figure 1:
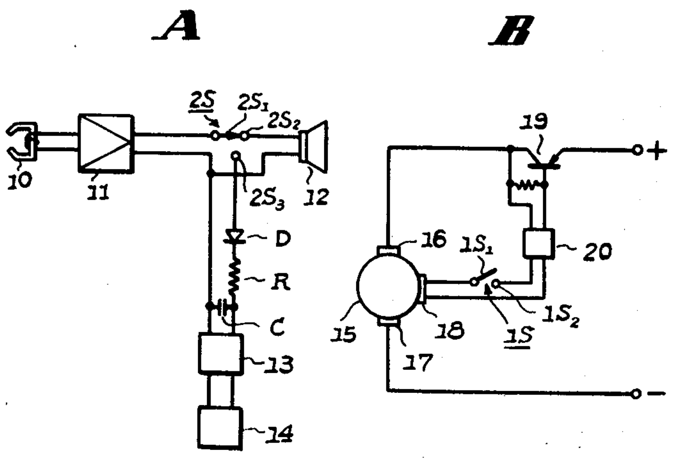
FIG. 1 is a schematic electrical diagram of the present invention, showing two circuits, one for sensing a nonsignal area on the tape and the other for controlling rotation of a motor.

Referring to the drawings, particularly FIG. 1, a circuit is shown for sensing a nonsignal area between programs recorded on one track of an endless magnetic tape in which the output of a magnetic head which is indicated by numeral 10 is amplified by a reproducing amplifier 11 and is heard by a speaker 12 through a movable contact piece $2S_1$, and a fixed contact $2S_2$ of a switch 2S. The magnetic head 10 is provided with a conventional head-elevating mechanism (not shown) utilizing an electromagnetic plunger to change over the track. The output current of the amplifier 11 is applied through the piece $2S_1$, and the fixed contact $2S_3$ to a diode D, resistor R and a condenser C. The diode, resistor, and condenser may vary the output current of the amplifier 11 to direct current to establish a delay circuit.

When the nonsignal area on the tape passes continuously over the magnetic head in excess of the time constant, the voltage between the terminal becomes zero. Such voltage between the terminals is sensed by a sensing circuit 13. The sensing circuit 13 is so adapted that its output is nil when the input voltage exists while the output reaches the maximum when the input voltage is nil. This sensing circuit may be obtained, for instance, by the use of a flip-flop circuit. The output of the sensing circuit 13 is incorporated in a switching circuit 14 as fully described hereinafter. As seen from the forego-ing, the nonsignal area on the tape is maintained for seconds so that the output of the sensing circuit reaches the minimum to be applied to the switching circuit 14 for switching operation when the movable contact piece $2S_1$ and fixed contact $2S_3$ are connected after changing from the condition of the switch 2S as shown.

FIG. 1 additionally shows a circuit for controlling the running speed of the magnetic tape in which numeral 15 denotes an electronic motor the rotary shaft of which serves as the capstan (not shown) for driving the magnetic tape feed. Its direct current is supplied to brushes 16, 17 through a transistor 19 for controlling the armature current. The voltage proportioned to rotation of the electric motor 15 is derived from the brush 18. This voltage output is applied through the movable contact piece $1S_1$, and fixed contact $1S_2$ to a conventional controlling circuit for controlling the base of the transistor 19. The electric motor 15 is rotated at low-constant speed under influence of action of the governor circuit comprising the controlling circuit 20, and transistor 19 when the movable contact piece $1S_1$and the contact $1S_2$ are closed. On the other hand, the electric motor is rotated at high speed when the piece $1S_1$ and contact $1S_2$ are opened to deactuate the governor operation to thereby reduce the resistance between the emitter and collector of the transistor 19 for increasing the armature current. Revolutions of the electric motor 15 under the operation of the governor is about 5-r.p.s. but the motor 15 is rotated at a speed about five times as much as that thereunder when the governor is deactuated. The magnetic tape is thus fed at constant speed in operation of the governor but at higher speed about five times as much in nonoperative condition of the governor.

Figure 2:
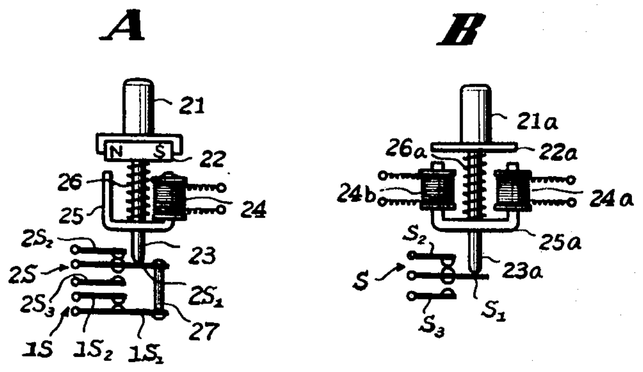
FIG. 2 is side elevational views of a pushbutton switch embodying switch means of FIG. 1.

Switches 1S and 2S are cooperatively actuated to be opened and closed. Means for controlling actuation of the switches are shown in FIG. 2. These switches are the class of pushbutton switches in the form of self-retention.

A cubic ferrite magnet 22 polarized by N and S is mounted on a pushbutton 21 at the lower end thereof with being provided with an elongated rod 23 thereon. The elongated rod 23 slidably passes through the opening on the base portion of a U-shaped yoke 25 having a coil 24 thereabout. The lower end of the rod is positioned in proximity of the movable contact piece $2S_1$ of the switch 2S. A spring 26 wound to the rod 23 is interposed between the ferrite magnet and the yoke 25. The pushbutton 21 is depressed and actuated against the bias of the spring 26. The movable contact piece $2S_1$ of the switch 2S and the piece $1S_1$ of the switch 1S are connected through a link 27 of insulation.

Now the pushbutton 21 is depressed against the bias of the spring 26 to cause the piece $2S_1$ to be pushed by the rod 23 thus keeping away from the fixed contact $2S_2$, and the piece $2S_1$ engages the fixed contact $2S_3$ while the piece $1S_1$ is away from the fixed contact $1S_2$ and the magnetic circuit of the magnet 22 is closed by the yoke 25. Even after the pushbutton 21 is released, the pushbutton is prevented form being restored to its normal position due to the spring by the attraction of the magnet 22 and the yoke 25 so that the switches 2S and 1S are held in position. This results in the tape being driven at high speed when the circuit is actuated as shown in FIG. 1B. If such a circuit is utilized, a nonsignal area is taken up as a signal after finishing the program recorded on the track in order to apply the signal to the coil and the magnetic flux generated thereby is in the direction opposite to the magnetic flux by the magnet 22. As a result, the magnet 22 and yoke 25 are no longer attracted and the pushbutton 21 is restored to its normal position by the bias of the spring 26 while the pieces $2S_1$ and $1S_1$ are restored to their normal position by self-elasticity to cause the switches 1S and 2S to be in the position as shown. Accordingly, the rotation of the electric motor 15 is restored to the low constant speed to thus terminate automatically the quick feed of the tape.

FIG. 2B is a representation of another modified embodiment of the present invention in which mild steel plate 22*a* is utilized instead of the ferrite magnet 22. In order to attract and retain the mild steel plate 22*a* in proximity of a yoke 25*a* by depression of a pushbutton 21*a*, it is preferable to normally supply small direct current to a coil 24*b*. Application of signal current as similarly shown in FIG. 2A to the coil 24*a* opposes the magnetic flux generated by coil 24*b*. The movable contact piece $S_1$ of the switch S may engage the fixed contact $S_2$ or $S_3$ by vertical movement of the rod 23*a*. Numeral 26*a* in this FIG. designates a spring for restoring the pushbutton 21*a*.

Figure 3:
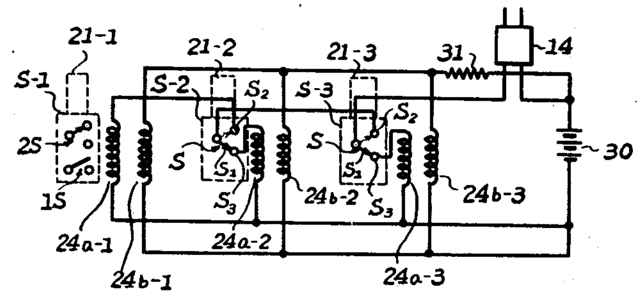
FIG. 3 is a circuitry diagram of one form of program-indexing means.

FIG. 3 shows a circuit for controlling the magnetic tape feed by the use of pushbutton switches to select the programs. Numerals 21-1, 21-2, 21-3 designate pushbuttons corresponding to respective pushbutton switches and S-1, S-2, and S-3 indicate switches which are controlled by their respective pushbuttons. The switch S-1 is similar to those switches 1S, and 2S shown in FIG. 2A and S-2, S-3 are similar to the switch S illustrated in FIG. 2B. These switches 1S, 2S are operated by the switch mechanism shown in FIG. 2B. Coils 24*b*-1, 24*b*-2, 24*b*-3 each corresponding to each group of switches are energized through a resistor 31 by a power source 30 and normally supplied with small current to attract and retain the mild steel plate 22*a*. These coils are each similar to the coil 24*b* shown in FIG. 2B. As corresponding to the coil 24*a*, coils 24*a*-1, 24*a*-2, 24*a*-3 are shown in FIG. 3 and they are connected through the switches S-2 and S-3 to the switching circuit 14 as shown.

The switching circuit 14 (See FIG. 1) is so adapted that the coil 24*a*-1 or 24*a*-2 or 24*a*-3 is selectively connected to the power source 30 and energized whenever one program is played by the signal of nonsignal area for a while to establish switching. The switches are positioned in a manner as shown by the solid line of FIG. 3 when the pushbuttons 21-1, 21-2, and 21-3 are depressed. The switch 1S of the switch S-1 is opened so that the tape would be fed by quick speed. On the other hand, the switch 2S is changed over the cause the output of the speaker to be nil.

In this manner, upon completion of the first program by feeding the tape at quick speed, the coil 24*a*-3 is energized to release the self-retention of the pushbutton 21-3 to restore it to its normal position through the movable contact piece $S_1$ and the fixed contact $S_3$ of the switching circuit. The pulse current applied to the coil 24*a*-3 through the switching circuit 14 is required to be shortly effected and to be nil at the time the movable contact piece $S_1$ is restored to engage the fixed contact $S_2$. When the quick tape feed is kept on and the next program is completed, the switching circuit 14 effects another pulselike energization; however, in this case, current is applied to the coil 24*a*-2 through the movable contact piece $S_1$ of the switch S-3, the fixed contact $S_2$, the movable contact piece $S_1$, and fixed contact $S_3$ of the switch S-2 so that the pushbutton 21-2 is released from its self-retention and restored to thus allow the movable contact piece $S_1$ of the switch S-2 to engage the fixed contact $S_2$. Upon completion of the third program by feeding the tape quickly, the switching circuit 14 effects one more pulselike energization; however, at this time, current is applied to the coil 24*a*-1 through the switches S-3 and S-2. Consequently, the pushbutton 21-1 is released from its self-retention and the switches 1S, and 2S of the switch S-1 are restored so that the magnetic tape is fed at constant speed whereby the reproducing sound can be heard from the speaker.

For the purpose of illustration, the foregoing explains that three programs are played by the quick tape feeding by depressing three pushbuttons 26-1, 26-2 and 26-3. It should be understood that the number of programs subject to quick tape feeding corresponds to the number of pushbuttons depressed; for instance, if the pushbuttons 21-1 and 21-2 are depressed, two programs are fed at the quick tape feed rate. Further, when the quick tape feed with respect to the program is finished, the tape is automatically restored to normal reproductive condition. Each pushbutton is also required to be exposed to the panel surface of the reproducing apparatus for being capable of operation of the button outwardly of the apparatus. The number of the pushbutton switch is preferably to be that of the program which is recorded on the track. A relay having a self-retained circuit may be substituted for the pushbutton switches as shown or a circuit may be used so that a first ring counter for counting and memorizing the number of depressions of a pushbutton and a second ring counter for counting the level of the output pulse of the switching circuit 14 are compared by the use of AND circuit whereby the tape feed is restored from high speed to constant speed upon coincidence. These are, of course, used to accomplish the same object had by the pushbutton switches.

Figure 4:
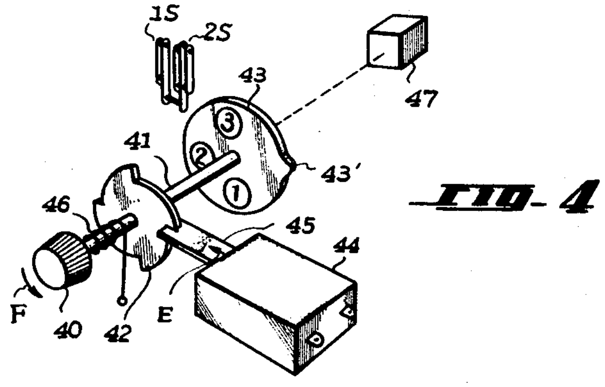
FIG. 4 is a perspective view showing a modified form of program-indexing means.

FIG. 4 is a representation of still another modified embodiment of the present invention. A ratchet wheel 42 and a cam wheel 43 are secured to a rotary shaft 41 carrying a knob 40 which is manually operated. The teeth of the ratchet wheel 42 are engaged by an actuator 45 of an electromagnetic plunger 44. The actuator 45 is urged by the spring (not shown) in the direction of arrow E. With this arrangement, when the knob 40 is rotated against the bias of a spring 46, the ratchet wheel 42 is held in a desired tooth thereof. The switches 1S, and 2S shown in FIG. 1 are positioned in proximity of the periphery of the cam wheel 43 and may be switched over by engagement with a projection 43′ of the cam wheel 43. Legends such as numerals on the cam wheel 43 can be seen through the exterior to indicate the degree of rotation of the knob 40. These legends may be provided on any other suitable position.

Digit 3 can be seen through the exterior in FIG. 4 which shows that three programs are played at quick speed so that the tape feed is automatically restored to the normal speed. The electromagnetic plunger 44 is actuated from the supply of pulselike current by the switching circuit 14 to cause the actuator 45 to move away from engagement with the ratchet tooth so that the ratchet wheel 42 is restored by one tooth under the influence of the spring 46. Numeral 47 designates a conventional mechanical governor mounted on the rotary shaft 41 for controlling rotation of the shaft 41 when the ratchet wheel 42 is restored.

Now three programs are played at quick speed, the projection 43′ of the cam wheel 43 engages the switches 1S, and 2S so that the movable contact piece $1S_1$ and the fixed contact $1S_2$ are closed with respect to the switch 1S while the movable contact piece $2S_1$ and the fixed contact $2S_2$ are closed with respect to the switch 2S. Thus, the quick tape feed is terminated to establish the constant feed so that the reproducing sound can be heard.

In order to initiate the quick tape feed, the knob 40 is rotated in the direction of arrow F as much as desired while reference is made to digits such as 1, 2, and 3. At this point, the switches 1S, 2S are released from the projection 43' to effect changeover. In case the program is one or two, rotation of the knob 40 is controlled in such a manner that digit is shown by 1 or 2 on the cam wheel 43. The cam wheel and the ratchet wheel may be integrally formed, if desired. Further, the ratchet wheel can be advanced by one tooth by depressing a suitable push button if the knob 40 is to be omitted.

Figure 5:
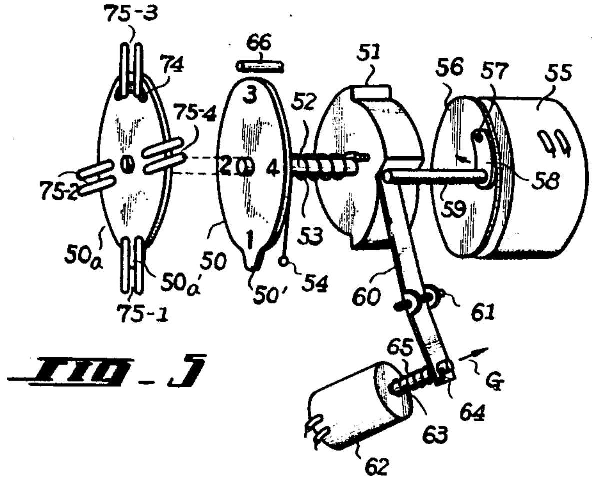
FIG. 5 is a perspective view of one form of program-indicating means.

Heretofore, means for selecting the program by quickly feeding the magnetic tape has been described; however, for selection of a program, it is required to identify the program by legend or the like. To this end, means is provided which is shown in FIG. 5.

Numeral 50 designates a program-indicating disc on which legends such as digits 1, 2, 3 and 4 are provided corresponding the respective programs recorded on one sound track. As shown, the legends can be seen through the exterior. The disc 50 and a ratchet wheel 51 are respectively mounted on a rotary shaft 52. A spring 53 is interposed between the ratchet wheel and the main body 54. A rotary lever 58 is supported on a shaft 57 provided on an actuator 56 for a rotary solenoid 55 and is urged by a less biased spring (not shown) in the direction of the arrow. A feed rod 59 is mounted on the lever 58 at one end thereof and is engaged by one of the teeth of the ratchet wheel 51.

With this arrangement, when pulselike current is applied to the solenoid 55, the actuator 56 turns round at 90° to advance the teeth of the ratchet wheel 51 so that the ratchet wheel and disc 50 turn round at 90°. At this time, the spring 53 is involved in tension; however, returning rotation of the spring is arrested by a detent plate 60. It follows that the disc 50 is rotated whenever pulselike current is applied to the rotary solenoid 55 so that a number is changed by one digit, namely 1, 2, .....

The detent plate 60 is pivotally supported by a pin 61 and an actuator 63 for an electromagnetic plunger 62 is slidably mounted on the plate at one end thereof. The actuator 63 is prevented from slipping out of the plate 60 by means of a pin 64 fixed to the top end of the actuator 63. The plate 60 is urged in the direction of arrow G by a spring 65 wound to the actuator 63. When pulselike current is applied to the plunger 62, the actuator 63 is attracted to rotate the plate 60 in the clockwise direction causing the one end thereof and the feed rod 59 to be away from the ratchet tooth. The ratchet wheel 51 is freely rotated by returning force of the spring 53 until a stop pin 66 and a projection 50' of the disc 50 are engaged with each other. At this point, digit 1 may be seen through the exterior to show the program.

Figure 6:
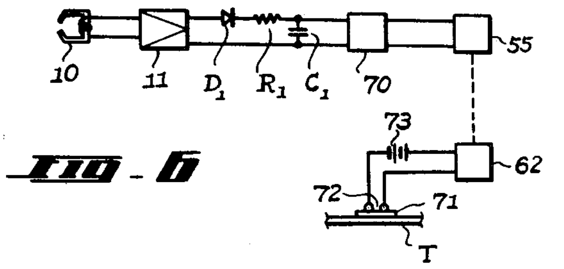
FIG. 6 is a circuit for actuating a rotary solenoid and electromagnetic plunger of FIG. 5.

A circuit for actuating a rotary solenoid 55 and electromagnetic plunger 62 will be described with reference being made to FIG. 6, in which like parts of FIG. 1A are designated by like numerals thereof.

The output of the magnetic head 10 is varied to direct current by a diode $D_1$, resistor $R_1$, and condenser $C_1$ through a reproducing amplifier 11 and is drained to a Schmidt circuit 70. The output of the Schmidt circuit 70 is applied to the rotary solenoid 55. The Schmidt circuit is so designed that the output thereof rapidly reaches the maximum when a nonsignal area on the tape will appear so that a positive pulse is obtained. The rotary solenoid 55 is thus actuated each time the program is completed.

When the magnetic tape T completes one cycle and an aluminum foil 71 short circuits a sensing contact 72, a closed circuit is established between the electromagnetic plunger 62 and a power source 73 to actuate the electromagnetic plunger 62 in a manner as described hereinbefore. At this time, the short circuit current caused by sensing contact 72 contacting the aluminum foil 71 effects the changeover of the sound track from one track to the next track thereof in the well-known manner so that the disc 50 indicates the first program on the track. An insulating plate **50*a* may be mounted on the shaft 52 without the use of the disc 50 since the program is indicated by lighting. That is, a conductive portion 74 is secured to the plate 50*a* and several of pairs of contact pieces 75–1, 75–2, 75–3, 75–4 are disposed on the periphery of the plate 50*a* as shown. By rotation of the plate 50*a*, these contact pieces are successively short-circuited. The respective electric light is turned on simultaneously with the short circuit of each contact piece, and thus the program may be indicated thereby. In this case, digits corresponding to the respective programs are illuminated in response to the short circuit of the contact pieces 75–1, 75–2, 75–3, 75–4. A projection 50*a'* is also provided on the plate 50*a* as in the case of the disc 50**.

Figure 7:
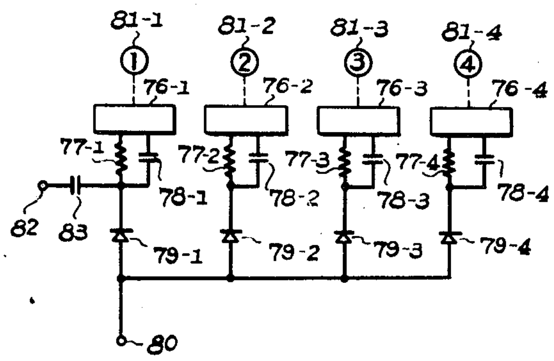
FIG. 7 is an electrical diagram of a modified form of program-indicating means.

A modified form of indicating means is shown in FIG. 7.

Numerals 76–1, 76–2, 76–3, 76–4 denote counting circuits in quaternion scale which comprise in combination a well-known ring counter or flip-flop circuit. Each gate member consists of resistors 77–1, 77–2, 77–3, 77–4, condensers 78–1, 78–2, 78–3, 78–4, diodes 79–1, 79–2, 79–3, 79–4. With this arrangement, when a positive pulse is drained from an input terminal 80 through a condenser 81, the circuit for the counting member 76–1 is energized to turn on the light (not shown) used as load for illuminating an indicating portion 81–1. Further, the positive pulse is applied to the input terminal 80 so that the counting member 76–2 is energized to turn on the light used as load for illuminating an indicating portion 81–2. In this manner, successive indicating portions 81–3, 81–4 are illuminated. The successive programs may be indicated by applying the positive pulse voltage to the input terminal 80 upon sensing the nonsignal area on the tape. If this circuit is so connected that a positive pulse is generated by the short circuit of the sensing contact (FIG. 2) through the aluminum foil 71 (FIG. 6) upon completion of one cycle of the tape, the counting circuit can be reset whenever the sound track is changed over, and the digit is returned to the indicating portion 81–1 to effect the indication of the program.

Figure 8:
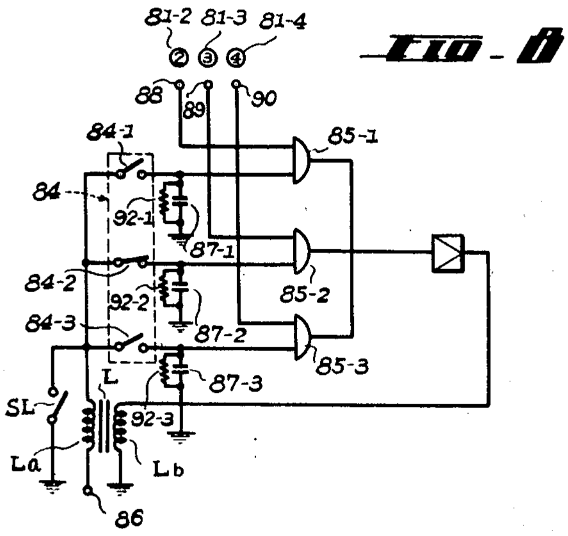
FIG. 8 is also an electrical diagram of another modified form of program-indexing means.

A circuit shown in FIG. 8 is capable of selection of the program by the use of the signal for indicating the program. An alternative selection switch 84 comprises switches 84–1, 84–2, 84–3 and one of these is closed while the others are opened. Numerals 85–1, 85–2, 85–3 designate AND circuits in which the output is obtained when a positive signal is applied to the two inputs of the gates. Character L denotes a relay which is provided with two coils L*a*, and L*b*, each of which is energized to decrease the magnetic flux deactuating the relay. The terminal 86 is connected to the plus side of the power source (not shown). As shown, the switch 84–2 is depressed while the others are opened. The charge current is then applied pulsatively through the condenser 87–2 to the coil L*a* to actuate the relay L at the same time the contact SL of the relay is closed to cause the relay to be self-retained. The relay L is provided with contacts (not shown) which are similar to the switches 1S and 2S of FIG. 1.

Upon the appearance of a positive pulse from terminal 89 to AND circuit 85–2, an output occurs and is amplified by an amplifier 91 and is applied to the coil L*b* to decrease the magnetic flux generated by the coil L*a* to deactuate the relay L thus releasing the self-retention thereof and returning the same to a deactuated state.

From the foregoing, it follows that by depressing one of the switches, the relay L is caused to be actuated. While one of the switches is depressed, a positive pulse applied from one of the terminals 88, 89, and 90, will cause relay L to be deactuated. Numerals 87–1, 87–2, and 87–3 denote condensers which are charged by depressing the switches 84–1, 84–2, and 84–3. Numerals 92–1, 92–2, and 92–3 designate resistors which discharge the condensers 87–1, 87–2, and 87–3.

In the play of the second program, depression of the switch 84–3 allows the relay L to be actuated and self-retained at the same time the switch 1S (FIG. 1) is opened to feed the tape at high speed. The nonsignal area positioned on the tape after the second program takes up the positive pulse which causes the program indication to be changed to the indicating portion 81–4. On the other hand, the positive pulse allows the relay L to be restored through the terminal 90, AND circuit so that the tape is fed at constant speed to thereby achieve normal playback with respect to the fourth program. Similarly, depression of the switch 84–2 results in feeding of the second program at high speed and, thereafter, the third program is selected for its playback.

As described hereinbefore, according to the circuit illustrated in FIG. 7, the program would be selected as desired. Further, with combination of the mechanism shown in FIG. 5 and the circuit in FIG. 7, the program selection as well as the program indicating may be obtained.

With the present invention, it is possible to automatically select one out of a plurality of programs recorded on the tape to provide further advantage in the playback of the endless tape.

While the preferred embodiment has been described, it should be understood that various changes or modifications may be made within the scope of the appended claims without departing from the spirit of the invention.

What is claimed is:

1. A control system for automatically switching the rate of feed of tape in a sound-reproducing apparatus in response to preselected coding to achieve automatic and almost immediate playback of a preselected program independent of its position upon the tape, said control system comprising:

a. a motor driven tape-feeding means;

b. an electrical source for energizing said motor;

c. a solid state device coupled between said motor and said source for controlling the flow of current from said source to said motor, thus controlling the rate of feed of tape;

d. means for varying the conductive state of said solid state device to cause said motor-driven tape-feeding means to automatically switch from a high rate of tape feed to a governed rate of tape feed in response to the detection of unrecorded portions of tape occurring between recorded programs, thereon, said means comprising:

i. a sensing circuit coupled to the tape for generating an output pulse every time said sensing circuit detects an unrecorded portion of tape; and ii. a comparison circuit for comparing the number of output pulses from said sensing circuit with a predetermined number corresponding to the sequential location of the desired program on said tape, said comparison circuit causing said solid state device to be rendered partially conductive to thus have said motor-driven tape-feeding mechanism switch from a high rate of tape feed to a governed rate of tape feed upon there being coincidence within said comparison circuit.

2. A control system as described in claim 1 additionally comprising indicating means for indicating which program is to be automatically selected for reproduction by the apparatus.

3. A control system as described in claim 1 wherein said comparison circuit additionally comprises a cam plate, a shaft supporting said cam plate, a ratchet wheel mounted coaxially with said cam plate, a spring for imparting rotation to said shaft by rotation thereof and a return means comprising an electromagnetic plunger having an actuator engaging the teeth of said ratchet wheel whereby upon manual rotation of said cam plate a program on said tape is designated for reproduction and the conductivity of said solid state device is varied so as to cause said tape feed means to feed tape at high speed until said electromagnetic plunger has been actuated in response to the outputs from said sensing circuit a sufficient number of times to allow said cam plate to rotate back to its initial position in ratchet wheel teeth intervals whereupon the conductivity of said solid state device is again varied so as to cause said tape-feeding means to be switched from its high rate of tape feed to its governed rate of tape feed.

4. A control system as described in claim 1 wherein said sound-reproducing apparatus is only capable of audibly reproducing a program appearing on said tape when said tape-feeding means is feeding tape at a governed rate.

5. A control system as described in claim 1 additionally comprising indicating means for indicating which program recorded on said tape is appearing at said sensing circuit, said indication means comprising a rotary solenoid energized by the output from said sensing circuit, a ratchet wheel rotated one tooth at a time by said rotary solenoid, an indicating plate mounted coaxially with said ratchet wheel and having program indicating digits appearing thereon, a spring for imparting a rotatable returning force to said ratchet wheel under the bias of the spring instituted by the rotation of said ratchet wheel, a lever engaging the teeth of the ratchet wheel for preventing the returning of said ratchet wheel in response to the bias of said spring, an electromagnetic plunger coupled to said lever and being energized upon the sensing by the system of the end of a track of tape whereby said indicating plate is rotated by the action of said rotary solenoid to indicate the program appearing at said sensing circuit and said electromagnetic plunger is actuated upon completion of a track of tape so as to release said lever from said ratchet wheel so that said indicating plate can be restored to its initial position of indicating the first program.

6. A control system as described in claim 1 wherein said comparison circuit additionally comprises a ring-counting circuit whereby said ring-counting circuit is actuated by the output from said sensing circuit and said ring-counting circuit is reset upon detection of the end of a track of tape.

7. A control system as described in claim 1 wherein said comparison circuit additionally comprises a plurality of pushbutton switches which are coupled within said comparison circuit such that the selected depression of the pushbutton switches will determine which program is to be automatically selected for reproduction by the apparatus.

8. A control system as described in claim 7 wherein said pushbutton switches are magnetically self-retaining, each switch containing a coil which when actuated opens its associated switch, the coil being coupled to the output of said sensing circuit and said switches being interconnected such that one and only one switch at a time responds by opening to a pulse initiated by said sensing circuit.